June 27, 1972 TSUKUMO NOBUSAWA 3,672,753

PHOTOCELL CONTROLLED DIAPHRAGM

Filed Nov. 7, 1969 2 Sheets-Sheet 1

INVENTOR
TSUKUMO NOBUSAWA
BY Stanley Weber
ATTORNEY

United States Patent Office 3,672,753
Patented June 27, 1972

3,672,753
PHOTOCELL CONTROLLED DIAPHRAGM
Tsukumo Nobusawa, Tokyo-to, Japan, assignor to Asahi
Kogaku Kogyo Kabushiki Kaisha, Tokyo-to, Japan
Filed Nov. 7, 1969, Ser. No. 874,739
Claims priority, application Japan, Nov. 13, 1968
(utility model), 43/82,517, 43/98,336
Int. Cl. G03b 7/00, 21/36
U.S. Cl. 352—91                                           8 Claims

ABSTRACT OF THE DISCLOSURE

A motion picture diaphragm control mechanism includes a photoconductor and resistor connected in series across a voltage source the junction being connected through a switch to the input of a Darlington amplifier. An adjustable diaphragm is connected to the armature of a meter movement whose winding is connected between a voltage terminal and the collector of the amplifier output transistor, the emitter thereof being grounded through a first variable resistor. A memory capacitor shunts the amplifier input. A second variable resistor may be connected through a switch across the capacitor and the capacitor may be connected to the voltage source through a third variable transistor and switch.

BACKGROUND OF THE INVENTION

The present invention relates generally to improvements in camera exposure mechanisms and it relates more particularly to an improved light controlled automatic diaphragm for motion picture cameras.

In counterlight or backlight object photography employing the so-called mean light measurement system, according to which an exposure meter arrangement indicates the means brightness value of the entire scene to be photographed, it is likely that the counterlight influence is so great as to result in the underexposure of the particular object to be photographed. Therefore, with respect to such particular object, a proper exposure is achieved only through a local light measurement system exposure meter arrangement. However, the conventional cameras usually rely on the function of said mean light measurement system exposure meter arrangement, and especially conventional automatic exposure control cameras are provided with such mean light measurement system exposure meter arrangement.

With such automatic exposure control cameras, in counterlight photography it is necessary to manually, instead of automatically, control exposure. Such manual operation is very inconvenient because the user must first read the automatically set diaphragm value indication and then compute the exposure value with consideration to the counterlight condition.

Moreover, an important drawback in the fade-in fade-out technique with a miniature cinecamera is the difficulty of maintaining the exposure variation speed approximately constant, and also, in overlap photography, the difficulty of performing overlap operation over the proper position of the film in accordance with the photographer's intention. In manual diaphragm adjusting operation for fade-in fade-out purpose, it is difficult to keep the diaphragm opening or closing speed approximately constant. This difficulty is further increased when a time limiting condition is imposed on such fade-in fade-out operations between their initiations and terminations.

SUMMARY OF THE INVENTION

It is a principal object of the present invention to provide an improved camera exposure control mechanism.

Another object of the present invention is to provide an improved light responsive automatic diaphragm control mechanism which may be adjusted to operate in a suitable manner in the photographing of back illuminated subjects.

Still another object of the present invention is to provide an improved light responsive motion picture camera automatic diaphragm mechanism for performing fade-out fade-in sequences.

A further object of the present invention is to provide an improved light responsive diaphragm control mechanism of the above nature characterized by its reliability, versatility, adaptability, compactness and low cost.

The above and other objects of the present invention will become apparent from a reading of the following description taken in conjunction with the accompanying drawings which illustrate preferred embodiments thereof.

In a sense the present invention contemplates the provision of a camera exposure control mechanism comprising a light measuring network including a photosensitive element and an output responsive to the light incident on said photosensitive element, an amplifier including an input and an output, a memory capacitor connected across said amplifier input, means including a first switch for connecting said light measuring network output to said amplifier input, means for adjusting the output of said amplifier independently of the input to said amplifier, an adjustable diaphragm, and electrically actuated motor means coupled to the output of said amplifier for controlling said adjustable diaphragm in response to the output of said amplifier.

According to the preferred form thereof the light measuring network includes in series connection a photoconductor and resistor, the network output being the voltage across the resistor. The amplifier is a Darlington network, the capacitor being connected between the ground and the base of the input electrode and the resistor being connected through a switch likewise between ground and the input transistor base. The emitter of the output transistor is grounded through a variable first transistor and the diaphragm is controlled by the armature of a meter whose coil is connected between a terminal of the voltage supply and the output transistor collector.

According to another embodiment of the present invention a second variable resistor is connected through a switch across the capacitor. In addition a third variable resistor connects the capacitor ungrounded terminal through a switch to the voltage supply ungrounded terminal.

The mechanisms described above permit the simple adjustment of the camera exposure for photographing back illuminated subjects. It also greatly facilitates and simplifies fade-out fade-in sequences in motion picture photography and is highly versatile, reliable and simple.

DESCRIPTION OF THE PREFERRED EMBODIMENTS

Figure 1:
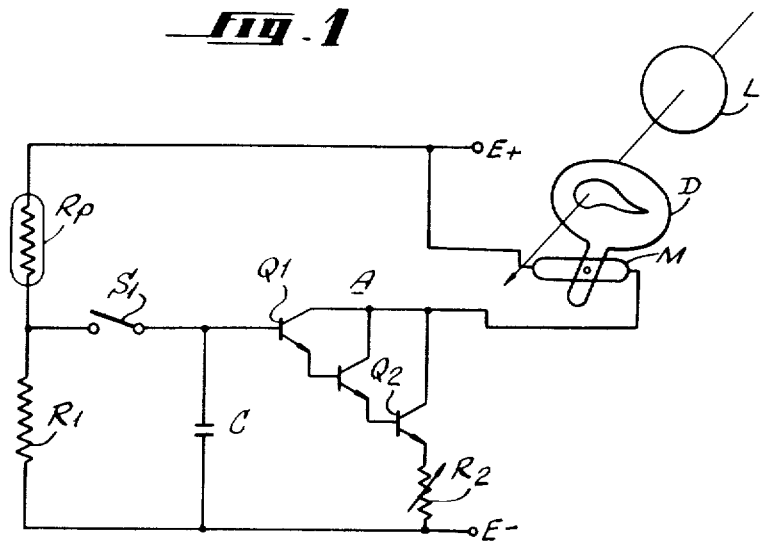
FIG. 1 is a schematic diagrammatic view of a preferred embodiment of the present invention.

Referring now to the drawings, and particularly FIG. 1 thereof which illustrates a preferred embodiment of the present invention, the reference letter L generally designates the objective lens of a motion picture camera and D a variable aperture diaphragm of known construction suitably positioned in the path of light traversing lens L in the known manner. The diaphragm D is mechanically coupled to the armature of a sensitive current meter M so that the aperture of diaphragm D in the light path varies inversely with the current through meter M whereby the diaphragm aperture is closed at maximum current and open at reduced currents.

Associated with the camera is a light measuring network including a photoconductor $R_p$ preferably exposed to the same field as lens L and connected in series with a resistor $R_1$. The outer terminal of photoconductor $R_p$ is connected to the ungrounded terminal of a suitable voltage supply and the outer terminal of resistor $R_1$ is connected to the opposite ground terminal of the voltage supply.

The output defining junction of photoconductor $R_p$ and resistor $R_1$ is connected through a switch $S_1$ to the base electrode of the input transistor $Q_1$ of a Darlington transistor amplifier A which includes an output transistor $Q_2$. The output of amplifier A as derived from the transistor collectors is connected through the winding of meter M to the voltage supply ungrounded terminal and the emitter of output transistor $Q_2$ is connected to ground through a manually adjustable first variable resistor $R_2$. A memory capacitor C is connected between the base of transistor $Q_1$ and ground.

Considering now the operation of the mechanism described above, with the resistor $R_2$ adjusted to a predetermined value corresponding to ordinary photographing conditions, and with the switch $S_1$ closed, the ordinary scene brightness information signal which is controlled by the photoconductor $R_p$ is applied between the base and the emitter of the Darlington amplifier input transistor $Q_1$ and, under the control of the transistors collector current in response to the brightness information signal the electric meter M is operated. Thus, in ordinary scene photography, the diaphragm blade D is driven by the operation of said electric meter M in response to the mean brightness of the viewed scene, thus performing the well-known automatic exposure control photographing operation.

When a counterlight scene is to be photographed, after the diaphragm blade D has been driven in the same manner as that described above in connection with an ordinary scene photography, the switch $S_1$ is manually opened. Then, through the action of the capacitor C which temporarily memorizes the brightness information signal as the across-terminal voltage due to the capacitor charge, the collector current of the high input impedance amplifier A is maintained in a condition which is the same as that before opening of the switch 2.

Then, the resistor $R_2$ is manually adjusted so as to set the resistance value thereof in accordance with the brightness difference between the less bright object to be photographed and the bright background. Thus, for example when the brightness difference corresponds to exposure coefficient 3, then the said resistance value is increased corresponding to this value 3. Then, the output current of amplifier A is decreased and as a result the collector current thereof is also decreased, so that the electric meter M drives the diaphragm blade D in its opening direction.

Thus, a proper exposure photographing of the less bright back illuminated object is possible because, through the above mentioned operation, the exposure set condition based on the mean brightness of the scene to be photographed is compensated through further diaphragm opening due to adjustment of the resistor $R_2$ corresponding to the exposure coefficient value.

When the counterlight-adjusted resistor $R_2$ is re-adjusted to return its value to the original one, the resistor $R_2$, as the emitter resistance of amplifier A, acts in a manner which is reverse to that which was mentioned above so that the diaphragm blade D is driven in the closing direction. Thus, through adjustment of the resistor $R_2$ in wider ranges, correspondingly wider range manual exposure setting operation can be carried out. Thus, employing the present system in cinecamera, manual fade-in and fade-out operations can be performed.

Figure 2:
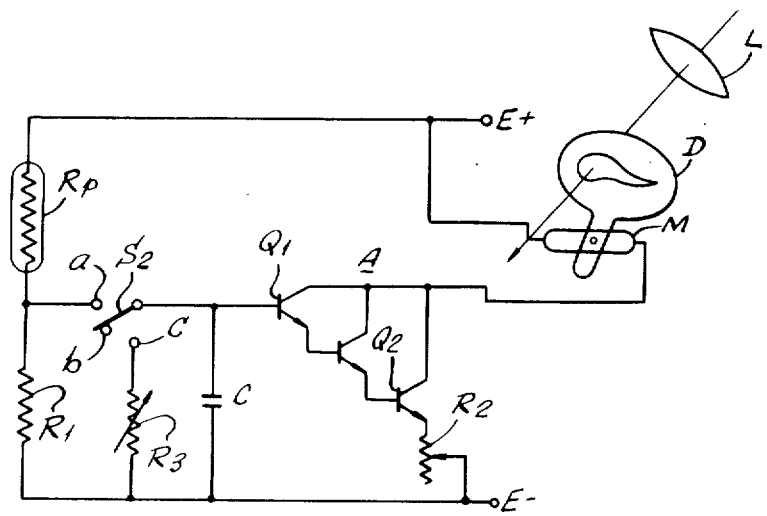
FIG. 2 is a schematic diagrammatic view of another embodiment of the present invention.

The embodiment of the present invention illustrated in FIG. 2 of the drawing differs from the first described in the provision of a second variable resistor and a switch for connecting the second variable resistor across the memory capacitor. In all other respects this mechanism is similar to that first described and the same reference letters designate corresponding elements.

Specifically a switch $S_2$ is substituted for switch $S_1$ and includes a switch arm and alternatively engageable contacts $a$, $b$ and $c$. The arm of switch $S_2$ is connected to the base of input transistor $Q_1$, contact $a$ is connected to the junction of photoconductor $R_p$ and resistor $R_1$, contact $b$ is floating and unconnected, and contact $c$ is connected through a second variable resistor $R_3$ to ground. The mechanism of FIG. 2 is otherwise similar to that first described.

Figure 3:
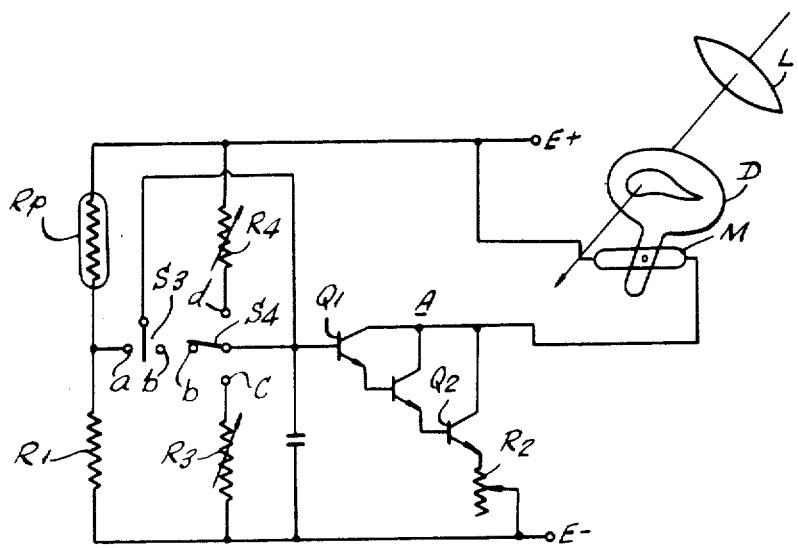
FIG. 3 is a schematic diagrammatic view of still another embodiment of the present invention.

The embodiment illustrated in FIG. 3 is similar to that illustrated in FIG. 2 in that it is provided with a third variable resistor and a modified switching arrangement for alternatively shunting the capacitor c by the second variable resistor or connecting it to the ungrounded voltage source for charging purposes. Specifically, a switch $S_3$ has an arm connected to the emitter of input transistor $Q_1$, a contact $a$ connected to the junction of photoconductor $R_p$ and resistor $R_1$ and a floating contact $b$, and a switch $S_4$ has an arm connected to the emitter of input transistor $Q_1$, a floating contact $b$, a contact $c$ connected through second variable resistor $R_3$ to ground and a contact $d$ connected through a third variable resistor $R_4$ to the ungrounded terminal of the voltage supply. The mechanism is otherwise similar to those earlier described.

In the operation of the mechanism illustrated in FIG. 2, first the variable resistor $R_2$ is set according to the predetermined ordinary photography value. Then, the information signal at the junction of photoconductor $R_P$ and resistor $R_1$, corresponding to the brightness of the scene to be photographed sensed by photoconductor $R_p$ is applied, through the change-over switch $S_2$ closed to the terminal $a$, to the input of amplifier A, which then controls the current supply to the electric meter M serially inserted in the collector circuit thereof in accordance with said information signal. Then, the electric meter M drives the diaphragm blade D in accordance with the supplied current, so that, under this condition, an automatic stop-down operation of the diaphragm blade D is carried out in accordance with the brightness of the scene to be photographed sensed by the photoconductor $R_p$.

Also, in the example of FIG. 3, a similar ordinary photographing operation is carried out with the change-over switches $R_3$ and $R_4$ closed to the terminal $a$ and the idle terminal $b$, respectively.

The fade-in fade-out operation under the above ordinary photographing condition is carried out as follows:

In performing a fade-in and fade-out sequence with the mechanism of FIG. 2, switch $S_2$ is closed to the idle terminal $b$. Then, across the input of amplifier A there is applied, through the variable resistor $R_2$, the voltage across the terminals of the capacitor C due to the charge corresponding to the ordinary photographing information signal. Due to the high input impedance characteristic of amplifier A, with the voltage across the capacitor C retained, the collector current is held in the condition corresponding to that immediately before said closing operation of the change-over switch $S_2$.

Under this condition, when the variable resistor $R_3$ is manually so adjusted that its resistance value is gradually decreased, then amplifier A, to whose input the voltage across the terminals of the capacitor C is applied whereby the base input current is increased so that the collector current is rapidly increased. This rapidly increasing collector current causes the electric meter M to drive the diaphragm blade D from its initial state in the stop-down direction until it is completely closed, thus carrying out a fade-out operation.

Then, when change-over switch $S_2$ is closed to the terminal $c$, variable resistor $R_3$ is connected in parallel with the capacitor C, so that, due to discharge through the variable resistor $R_3$, the voltage across the terminals which has been retained during said fade-out operation is gradually decreased. Accordingly, the base current of the complex transistor arrangement is gradually decreased and the collector current thereof is decreased. This causes the electric meter M to drive the diaphragm blade D in the opening direction, thus performing a fade-in operation.

Thus, in the mechanism of FIG. 2, the speed of the fade-out operation is determined by the speed of manual adjustment of the variable resistor $R_2$. In actual fade-in fade-out overlap photographing operation, first a fade-out operation is performed, and then, after winding back this fade-in film portion, a fade-in operation is carried out. Therefore, through adjustment of the variable resistor $R_3$ in accordance with either the actual fade-out time, or this time determined by the wound-back film length, it is possible to automatically control the discharge speed of the capacitor C through resistor $R_3$ upon the fade-in photographing operation, and accordingly the time required for the fade-in operation, thus enabling the operator to accomplish the fade-in fade-out operation with the predetermined film length in the most suitable manner.

In the example of FIG. 3, first the change-over switch $S_3$ is closed to the idle terminal $b$ so that, as in the case of the last example, the capacitor C is under a temporarily retained charge condition. Then, when the change-over switch $S_4$ is closed to the teminal $d$, the capacitor C is additionally charged through the variable resistor $R_4$. As the voltage across the capacitor C is increased, the input current of the amplifier A is also increased and this causes a rapid increase of the collector current, which drives the electric meter M in the diaphragm stop-down direction. Accordingly, the fade-out speed can be automatically controlled through adjustment of the variable resistor $R_4$.

The fade-in operation can be accomplished in the same manner as that of the above example by closing the change-over switch $S_4$ to the terminal $c$, thus establishing a discharge circuit for capacitor C through the variable resistor $R_3$. The fade-out speed can be controlled by adjusting the variable resistor $R_3$. Accordingly, when the variable resistors $R_4$ and $R_3$ are so arranged as to be adjusted in a mechanically coupled operation, an excellent fade-in fade-out operation can be achieved. In the mechanism of FIG. 3, variable resistor $R_2$ is in the emitter circuit of the amplifier A in order to accomplish the zero scale point adjustment of the electric meter M by adjusting the value of the variable resistor $R_2$.

Thus, according to the present invention, the scene brightness information signal is applied across the base and the emiter of the Darlington coupled transistor amplifier; with the information signal temporarily retained as the across-terminal voltage of the capacitor, the emitter resistor of the transistor arrangement is adjusted so that the fade-out photographing operation is carried out; and it is possible to automatically determine the fade-in speed by adjusting the resistance value inserted in the capacitor discharging circuit, or to automatically determine the fade-out speed by adjusting the resistance value inserted in the capacitor charging circuit. Accordingly, the great advantage of the present invention is that a miniature cinecamera according to the present invention can carry out the fade-in fade-out operation in a ready and accurate manner.

As explained above, an object of the present invention is to automatically control the exposure value for the fade-in fade-out photographing operation through a simple switch manipulation. When the adjustment operation for such automatic control operation is stopped, that is, the change-over switches $S_3$ and $S_4$ are closed to the respective idle terminals $b$, then the exposure value of this change-over time is retained. The present mechanism can thus be utilized for manual exposure control.

I claim:

1. A camera exposure control mechanism comprising a light measuring network including a photosensitive element and an output responsive to the light incident on said photosensitive element, an amplifier including an input and an output, a memory capacitor connected across said amplifier input, means including a first switch manually operable independent of the camera shutter for connecting said light measuring network output to said amplifier input, means for adjusting the output of said amplifier independently of the input to said amplifier, an adjustable aperture diaphragm, and electrically actuated motor means coupled to the output of said amplifier for controlling the aperture of said adjustable diaphragm in response to the output of said amplifier.

2. The mechanism of claim 1 wherein said amplifier comprises a plurality of Darlington coupled transistors including an input transistor having a base electrode connected to a terminal of said capacitor, and an output transistor including a collector and emitter, said amplifier adjusting means comprising a first variable resistor, said motor means comprising an electrical meter including a winding, said winding, said first variable resistor and said output transistor collector and emitter being connected in series.

3. The mechanism of claim 1 comprising a second variable resistor, said first switch comprising first and second contacts and an arm selectively engaging alternative of said contacts, said first contact being connected to said light measuring network output, said second variable resistor being connected between said second contact and one terminal of said capacitor and said switch arm being connected to the other terminal of said capacitor and said amplifier input.

4. The mechanism of claim 1 comprising means for charging said capacitor independently of the output of said light measuring network including a third variable resistor and a second switch connected in series with said capacitor across a voltage source.

5. The mechanism of claim 1 comprising second and third variable resistors and switching means for selectively alternatively connecting said second variable resistor across said capacitor or said capacitor through said third variable resistor to a source of current.

6. The mechanism of claim 1 wherein said photosensitive element comprises a photoconductor and said light measuring network comprises a resistor connected in series with said photoconductor across a voltage source, the junction of said photoconductor and resistor defining said output terminal of said light measuring network, said amplifier comprising an output transistor including collector and emitter electrodes, and said adjusting means comprising a first variable resistor, said emitter electrode being connected through said first variable resistor to one terminal of a voltage source and said collector electrode being connected through said motor to the other terminal of said voltage source.

7. The mechanism of claim 6 including a second variable resistor and means including a switch for connecting said second variable resistor across said capacitor.

8. The mechanism of claim 6 including second and third variable resistors and switching means for selectively alternatively connecting said second variable resistors across said capacitor or said capacitor through said third variable resistor to said voltage source.

References Cited

UNITED STATES PATENTS

| | | | |
|---|---|---|---|
| 3,299,789 | 1/1967 | Chandler et al. | 95—10 C X |
| 3,324,779 | 6/1967 | Nobusawa et al. | 95—10 C X |
| 3,419,325 | 12/1968 | Mayr et al. | 352—91 |
| 3,422,738 | 1/1969 | Mori et al. | 95—10 C |
| 3,429,242 | 2/1969 | Yoshida et al. | 95—10 C |
| 3,517,990 | 6/1970 | McGillion et al. | 352—141 X |
| 3,520,597 | 7/1970 | Fujii | 352—141 |

FOREIGN PATENTS 738,714   7/1966   Canada   95—10

SAMUEL S. MATTHEWS, Primary Examiner

M. L. GELLNER, Assistant Examiner

U.S. Cl. X.R.

95—10 C D, 64 D; 352—141